(12) United States Patent
Karp

(10) Patent No.: US 6,288,701 B1
(45) Date of Patent: Sep. 11, 2001

(54) USER PROGRAMMABLE SCROLLING DISPLAY

(76) Inventor: William Karp, 23425 Park Hermosa, Calabasas, CA (US) 91302

( * ) Notice: Subject to any disclaimer, the term of this patent is extended or adjusted under 35 U.S.C. 154(b) by 0 days.

(21) Appl. No.: 09/490,121

(22) Filed: Jan. 24, 2000

(51) Int. Cl.[7] .................................................. G09G 5/34
(52) U.S. Cl. ................................................................. 345/123
(58) Field of Search ........................... 345/121, 123–125; 340/825.44

(56) References Cited

U.S. PATENT DOCUMENTS

| | | | |
|---|---|---|---|
| 4,160,242 | * | 7/1979 | Fowler et al. . |
| 4,500,880 | * | 2/1985 | Gomersall et al. . |
| 4,952,927 | * | 8/1990 | DeLucca et al. . |
| 5,281,962 | * | 1/1994 | Vanden Heuvel et al. . |
| 5,398,022 | * | 3/1995 | Lipp . |
| 5,430,436 | * | 7/1995 | Fennell . |
| 6,141,018 | * | 10/2000 | Beri et al. . |

* cited by examiner

*Primary Examiner*—Jeffery Brier
(74) *Attorney, Agent, or Firm*—Richard A. Joel, Esq

(57) ABSTRACT

This invention comprises a user programmable scrolling display which includes a plastic case having a liquid crystal display on the exterior face thereof, control buttons by which one ray create, edit, store and display a multiplicity of messages and a rear face including a steel pin arrangement to affix the display unit to clothing. The rear face also includes serial interface holes for coupling an interior mounted printed circuit board to a computer to provide a second method for programming messages. Alternatively, the invention may include a plastic clip affixed to a vertical surface by means of double sided tape, such clip supporting the steel pin. In another embodiment, the display unit comprises an elongated base and a display portion extending outwardly therefrom for insertion to an aperture in a foam board or cardboard unit. The display and control buttons are on the forward face or alternatively may be mounted on the elongated rear portion. In a further embodiment of the invention, a bracket may be mounted to the base of the display for connection to shelves in point of purchasing use.

8 Claims, 2 Drawing Sheets

USER PROGRAMMABLE SCROLLING DISPLAY

CROSS-REFERENCE TO RELATED APPLICATIONS

Not applicable.

STATEMENT REGARDING FEDERALLY SPONSORED RESEARCH OR DEVELOPMENT

Research and development of the present invention and application have not been Federally sponsored, and no rights are given under any Federal program.

BACKGROUND OF THE INVENTION

1. Field of the Invention

This invention relates to user programmable scrolling displays such as wearable badges, advertising modules and modules to be integrated into apparel. The invention comprises a liquid crystal display mounted in a case with interior printed circuit board and exterior control buttons to activate the scrolling display to present various user created messages.

2. Description of the Related Art Including Information Disclosed Under 37 CFR §§1.97–1.98

The prior art includes patents which disclose a variety of hand held and programmable displays. Scrolling displays, per se, are also shown in the prior art.

U.S. Pat. No. 5,841,878 to Arnold, et al discloses a card sized hand held sound and display unit that will display an image or produce sound based upon the depression of a switch. A data scroll switch and a LCD display are also disclosed.

U.S. Pat. No. 5,625,608 to Grewe, et al discloses a hand held remote control unit with a LCD display. The display has a number of menus that are modified by the control buttons on the front of the unit.

U.S. Pat. No. 5,893,798 to Stambolic, et al discloses a hand held electronic game with a number of buttons used to modify an LCD or LED display. The device includes a programmable microcomputer and a scrolling display.

U.S. Pat. No. 5,602,728 to Madden discloses a hand held programmable LCD display unit that utilizes only three buttons to control the messages displayed on the unit.

Other patents of interest include U.S. Pat. Nos. 4,768,300; 5,047,952; 5,317,671; 5,363,092; 5,388,061; 5,826,235; 5,890,121; and, 5,892,455.

The prior art, while disclosing the general concept of programmable displays fails to anticipate the unique aspects of applicant's invention disclosed hereinafter.

SUMMARY OF THE INVENTION

This invention relates to displays and particularly to user programmable scrolling displays. The display comprises a liquid crystal display (LCD) mounted in a plastic case with a plurality of control buttons extending outwardly therefrom A printed circuit board is mounted within the case and coupled to the LCD display to activate the various messages in a manner determined by the ins control buttons. A power source and microprocessor are also mounted within the case. The internal circuitry will not be discussed in detail since the general teachings are available in the prior art cited above.

In one embodiment, the display includes a built-in steel pin for attachment to apparel. The display may be provided with a double sided foam tape for attachment to a vertical surface or with a special purpose clip that may be affixed to a vertical surface with double sided foam tape. The display can be affixed to the clip but may be lifted off to permit use with apparel.

The essence of the invention is a user programmable scrolling display in which one may create, edit, store and display a multiplicity of personal messages by manipulating the integral control buttons. One may also vary the scrolling speed and choose the number of times a message will repeat. The display is mounted in a unique case with an integral pin to attach to clothing in a badge-like arrangement or it may be affixed to a vertical surface with tape or a special clip. The foregoing display may also be mounted in a special case for use in point of purchase displays or giftware.

In a further embodiment of the invention, the display may be affixed to tee-shirts, caps and other apparel as well as bags and backpacks using a special clip that is permanently affixed to the cloth. A display case is then affixed to the clip with two screws or by similar means. This permits the case to be removed to allow cleaning of the apparel. The same case, without the clip, may be affixed to a foam board, cardboard, merchandise board, etc.

In an alternate embodiment, the display may be programmed using an external computer which connects to the display through a two-pin serial interface. A two pin connector passes through two holes on the back of the case and contacts pads on the printed circuit board.

Accordingly, an object of this invention is to provide a new and improved user programmable scrolling display.

An another object of this invention to provide a user programmable scrolling display which may be attached to clothing.

A further object of this invention is to provide a LCD display which is mounted within a case having control buttons extending outwardly therefrom to control a scrolling display and including a unique clip mounted to said case to affix the display on apparel or other designated surfaces.

BRIEF DESCRIPTION OF THE DRAWINGS

The above and other objects and advantages of this invention may be more clearly seen when viewed in conjunction with the accompanying drawings wherein.

DETAILED DESCRIPTION OF THE INVENTION

Figure 1:
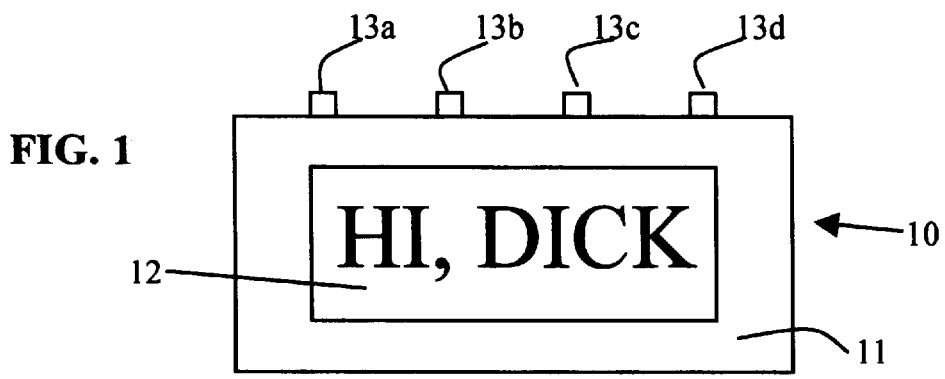
FIG. 1 is a front view of the display comprising the invention.

Referring now to the drawings, and in particular FIG. 1, the invention comprises a user programmable scrolling display unit ("UPSD") 10 which is mounted within a plastic case 11 and includes a liquid crystal display (LCD) 12 and a plurality of control buttons 13a–13d on the exterior thereof.

The LCD 12 presents various messages in a scrolling fashion, such messages created and displayed by manipulation of the four control buttons 13a–13d. It is also possible with the subject display to create, edit, store and display up to ten different scrolling messages, each containing up to two hundred fifty five characters, and all messages combined ranging up to approximately eight hundred ninety characters. The user may vary the scrolling speed, select the number of times a message repeats before it turns off, select any one of the stored messages to be displayed or may display all of the stored messages in sequence.

Since the circuitry for scrolling LCD displays is well known and described in the prior art cited herein, the precise circuit and the operation will not be described in detail. Applicant, however, is providing unique uses for such display circuitry in unique displays structures which are useful, attractive and inexpensive.

Figure 2:
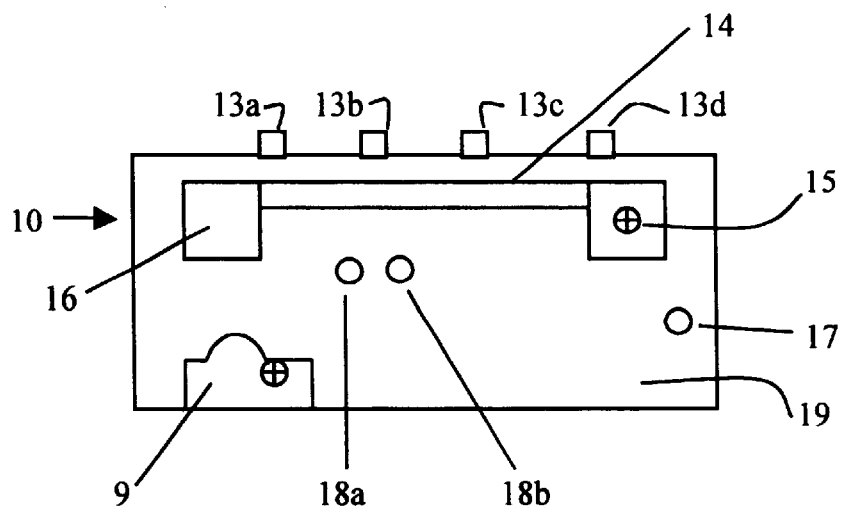
FIG. 2 is a rear view of the display comprising the invention.

FIG. 2 shows the rear of the display 10 wherein a steel pin 14 is affixed at one end to the screw mounting 15 and it is connectable at its other end to the mounting 16. A reset hole 17 and a pair of serial interface holes 15a, 18b for coupling to a computer are also positioned on the rear 19 of the unit 10. The pin 14 is spaced a predetermined distance from the rear 19 so that a plastic clip 20 shown in FIG. 5, may be mounted between the pin 14 and the rear 19. A battery compartment door is shown at 9.

Figure 3:
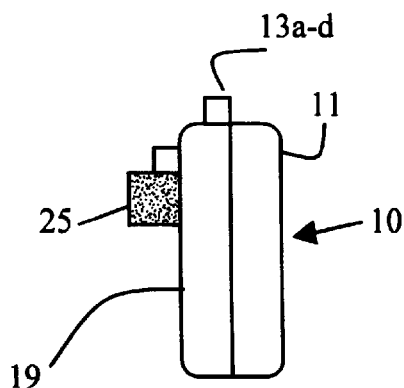
FIG. 3 is a side view of the display comprising the invention.

FIG. 3 depicts an optional embodiment with double sided foam tape 25 mounted on the rear 19 of the unit 10 so that the unit 10 can be affixed to various surfaces by merely contacting, the surface with the tape mounting.

Figure 4:
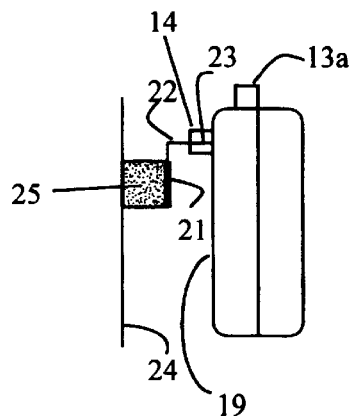
FIG. 4 is a side view illustrating the display with a clip.
Figure 5:
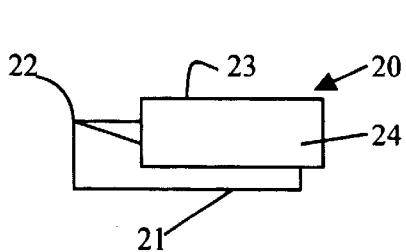
FIG. 5 is a perspective view of the clip shown in FIG. 4.

The plastic clip 20 shown in FIG. 5, includes a lower downwardly extending surface 21, an intermediate surface 22 extending outwardly at right angles thereto and an upwardly extending surface 23 which is substantially parallel to the surface 21. As shown in FIG. 4, the upper portion 23 of the clip 20 is inserted between the steel pin 14 and the rear surface 19. The downward portion 21 of the clip 20 may be provided with a double sided foam tape 25 so that the unit 10 raay be affixed to vertical surfaces 24.

Figure 6:
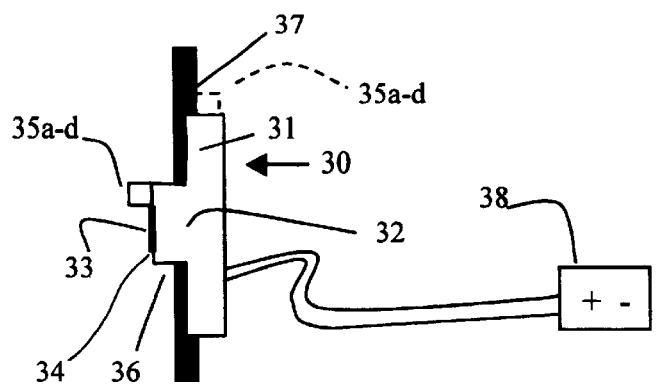
FIG. 6 is a side view of the display mounted in a wall of foam board comprising a point of purchase display; and, FIG. 7 is a side view of the invention having a bracket for attachment to store shelving, walls, merchandise displays etc.

FIG. 6 depicts an alternate embodiment of the invention wherein a display unit 30 includes an elongated flange-like end portion 31 and an outwardly extending portion 32 set back from the surface flange like portion 31. The display 33 is mounted on one face 34 of the unit 30 along with control buttons 35a–35d. The portion 32 is inserted through an aperture 36 in a foam board or cardboard 37 and held in position by the elongated extending portion 31. Alternately, the control buttons 35a–d may be mounted to the surface as shown in phantom particularly where it is desired to hide the controls in point of purchase displays. An external battery box 38 may be provided when longer battery life is required. The arrangement shown in FIG. 6 is particularly suited for use in which the unit 30 is mounted in a foam board or cardboard unit 37 to form a UPSD "greeting card" or advertising display.

Figure 7:
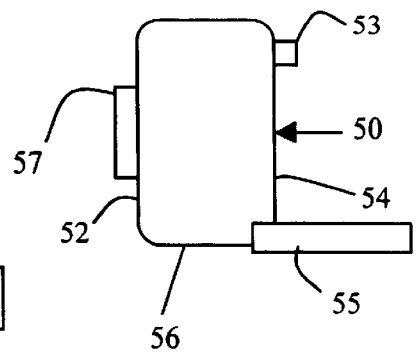

FIG. 7 depicts a display unit 50 wherein the LCD display is mounted on the front face 52 with hidden control buttons 53 mounted on the rear face 54. A bracket 55 or similar mounting means is connected to the base 56 of the unit 50 so that the unit may be affixed to store shelving, walls or merchandising displays for point of purchase use.

While the invention has been explained by a detailed description of certain specific embodiments, it is understood that various modifications and substitutions can be made in any of them within the scope of the appended claims which are intended also to include equivalents of such embodiments.

What is claimed, is:

1. A user programmable scrolling display unit for creating editing, storing and displaying a plurality of messages as badges attached to clothing or in merchandising displays comprising:

a closed case having a front face and a rear face and side portions joining said faces;

a programmable control circuit mounted within said case;

an LCD display for presenting a scrolling display mounted on the front face and coupled to the control circuit within said case;

a plurality of control buttons extending outwardly from the case, said buttons being coupled to the control circuit to provide a means to create, edit, store and display messages and also to vary the scrolling speed of messages on the LCD display and to choose the number of times a message will repeat before the display shuts off; and, serial interface apertures on the rear face for access to the control circuit for alternative programming of said circuit via an external computer.

2. A user programmable scrolling display unit for creating, editing, storing and displaying a plurality of messages in accordance with claim 1 further including:

mounting means comprising first and second spaced mountings affixed to the rear face of the unit and projecting outwardly therefrom and a pin fixedly connected to the first mounting and removably mounted to the second mounting to permit attachment to the clothing.

3. A user programmable scrolling display unit for creating, editing, storing and displaying a plurality of messages in accordance with claim 2 further including:

a clip comprising a substantially rectangular upper portion, an intermediate portion extending at a right angle to the upper portion, and a lower portion extending downwardly from the intermediate portions and a double sided foam tape mounted to the downwardly extending portion for mounting said clip to apparel and wherein the pin is spaced a predetermined distance from the rear face to permit the upper portion of the clip to be inserted therebetween to mount the case thereon.

4. A user programmable scrolling display unit for creating, editing, storing and displaying a plurality of messages in accordance with claim 1 further including:

double-sided foam tape mounted on the rear portion of the case for connecting the unit to a vertical surface.

5. A user programmable scrolling display unit for creating, editing, storing and displaying a plurality of messages in accordance with claim 1 wherein:

the rear portion comprises an elongated flange like base; and, the front portion having the display mounted thereon extends upwardly from a portion of said rear portion; and, a board having an aperture for insertion of the upwardly extending front portion to form a point of purchase display or gift.

6. A user programmable scrolling display unit for creating, editing, storing and displaying a plurality of messages in accordance with claim 1 further including:

a computer for programming messages;

a printed circuit and board including the control circuit; and, a built in interface for coupling to the computer for downloading messages.

7. A user programmable scrolling display unit for creating, editing, storing and displaying a plurality of messages in accordance with claim 1 further including:

a shelf bracket mounted at one end to the case and mountable at the other end to a shelf to form a point of purchase display.

8. A user programmable scrolling display unit for creating, editing, storing and displaying a plurality of messages as badges to clothing or in merchandising displays comprising:

a closed case having a front face and a rear face spaced therefore and side portions joining said faces;

a programmable control circuit mounted within said case;

an LCD display for presenting a scrolling display mounted on the front face and coupled to the control circuit within said case;

a plurality of control buttons extending outwardly from the case, said buttons being coupled to the control circuit to provide a means to create, edit, store, and display messages at a predetermined speed on the LCD display and to choose the number of times a message will repeat before the display shuts off; and, serial interface apertures on the rear face for access to the control circuit for alternative programming of said circuit via an external computer.

* * * * *